(12) United States Patent
Sharma et al.

(10) Patent No.: US 8,209,563 B2
(45) Date of Patent: *Jun. 26, 2012

(54) STRATEGY TO VERIFY ASYNCHRONOUS LINKS ACROSS CHIPS

(75) Inventors: Debendra Das Sharma, Santa Clara, CA (US); Gurushankar Rajamani, Sunnyvale, CA (US); Hanh Hoang, Bay Point, CA (US)

(73) Assignee: Intel Corporation, Santa Clara, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 12/756,998

(22) Filed: Apr. 8, 2010

(65) Prior Publication Data

US 2010/0199120 A1 Aug. 5, 2010

Related U.S. Application Data

(63) Continuation of application No. 12/235,532, filed on Sep. 22, 2008, now Pat. No. 7,770,051, which is a continuation of application No. 10/815,903, filed on Mar. 31, 2004, now Pat. No. 7,464,287.

(51) Int. Cl.
G06F 1/04 (2006.01)
G06F 17/50 (2006.01)
G06G 7/62 (2006.01)

(52) U.S. Cl. ............ 713/600; 703/13; 703/14; 703/15

(58) Field of Classification Search ........... 713/600; 717/13, 14, 15; 703/13, 14, 15
See application file for complete search history.

(56) References Cited

U.S. PATENT DOCUMENTS

| | | | |
|---|---|---|---|
| 5,953,372 A | 9/1999 | Virzi | |
| 6,009,488 A | 12/1999 | Kavipurapu | |
| 6,023,777 A | 2/2000 | Knaack | |
| 6,347,380 B1 | 2/2002 | Chang et al. | |
| 6,476,628 B1 | 11/2002 | LeColst | |
| 6,519,722 B1 | 2/2003 | Wiggins | |
| 6,584,584 B1 | 6/2003 | Smith | |
| 6,745,265 B1 | 6/2004 | Sindalovsky | |
| 6,876,207 B2 | 4/2005 | Haass et al. | |
| 6,990,073 B1 | 1/2006 | Sandoval | |
| 7,007,212 B2 | 2/2006 | Komatsu et al. | |
| 7,042,911 B2 | 5/2006 | Toshitani | |
| 7,464,287 B2 * | 12/2008 | Sharma et al. ............. 713/600 |
| 7,770,051 B2 * | 8/2010 | Sharma et al. ............. 713/600 |
| 2004/0022099 A1 | 2/2004 | Ozawa | |

OTHER PUBLICATIONS

Intel Corp., *Non Final Office Action* mailed on Mar. 31, 2008; U.S. Appl. No. 10/815,903.
Intel Corp., *Non Final Office Action* mailed Jan. 12, 2010; U.S. Appl. No. 12/235,532.

* cited by examiner

*Primary Examiner* — Ji H Bae
(74) *Attorney, Agent, or Firm* — Blakely, Sokoloff, Taylor & Zafman LLP

(57) ABSTRACT

Various embodiments of the invention provide a frequency shifter to vary the frequency of data transmitted over time, such as to increase and decrease the frequency of test data transmitted over time to verify a digital communication device's ability to receive data having various frequencies within a specific parameter range. The frequency shifter includes a frequency modifier to shift or vary an input clock frequency to a variety of output clock frequencies, such as according to a test protocol. The frequency shifter also includes an elastic data buffer to receive the test data at the input clock frequency and to output the test data at the plurality of output clock frequencies provided by the frequency modifier.

19 Claims, 4 Drawing Sheets

STRATEGY TO VERIFY ASYNCHRONOUS LINKS ACROSS CHIPS

RELATED APPLICATIONS

This application is a continuation of U.S. application Ser. No. 12/235,532 filed Sep. 22, 2008 issued as U.S. Pat. No. 7,770,051 on Aug. 3, 2010, which issued as U.S. Pat. No. 7,770,051 on Aug. 3, 2010, which is a continuation of U.S. application Ser. No. 10/815,903 filed Mar. 31, 2004 issued as U.S. Pat. No. 7,464,287 on Dec. 9, 2008.

FIELD

Embodiments of the invention relate to confirming that digital communication chips or devices will allow for the frequency of data received to vary within a specified frequency range.

BACKGROUND

Digital communication chips or devices, such as those that receive data from an input/output (I/O) interface such as a peripheral components interconnect (PCI), a peripheral components interconnect extended (PCI-X), a peripheral components interconnect express (PCI-E) to the northbridge chipset, and/or that communicate across an asynchronous communication link may have clock speeds that are different from one another as a result of design factors, manufacturing factors, external factors such as temperature, and/or clock crystals having different frequencies. Thus, during communication, such a chip may receive data at a frequency different than the clock frequency at which the chip is operating. Thus, such communication chips often have a data buffer, such as an elastic buffer, for buffering receive data to compensate for such variations in receive data frequency within a specification range. In addition, data transmitted to such communication chips often includes transmit marker type data packets that also help the chip to compensate for such variations in receive data frequency within a specification range.

For example, such a chip may use an elastic data buffer to receive data so that consumption of the data by the chip is independent of the rate the data is received by the buffer until the buffer is empty or overflows. In addition the inclusion of marker type data packets in the receive data allows the chip to consume but ignore the marker data, or to drop or dispose of the marker data prior to consumption depending on whether the chip is receiving data faster or slower than the data is being consumed. As a result a chip that is consuming data faster than it is being received may consume and ignore marker data until its elastic buffer is empty and then simply wait for more data (e.g., provided that more data is received is within a specific time period that does not cause an error for the chip). Alternatively, such a chip that is consuming data more slowly than the data is being received can drop marker data and allow its elastic buffer to fill with received data (e.g., provided the data being received is within a specific frequency range that does not overflow the buffer).

As a result, chips or devices that support digital communication, such as chips that support communication via PCI, PCI-X, PCI-E, and/or other asynchronous communication or protocol may be designed to allow for differences in clock speeds or data received frequency within a parameter range.

Moreover, these chips or devices may be tested to ensure that their receiving circuitry and/or data buffer for receiving data comply with requirements, such as an allowable range of data receive clock speeds or frequencies over a time period as required by a protocol, communication, device, or chip specification.

DETAILED DESCRIPTION

Various embodiments of the invention provide a frequency shifter to vary the frequency of data transmitted over time, such as to vary the frequency of test data transmitted over time to verify a digital communication device's ability to receive data having various frequencies within a specific parameter range. The frequency shifter includes a frequency modifier to shift or vary an input clock frequency to a variety of output clock frequencies, such as according to a test protocol. The frequency shifter also includes an elastic data buffer to receive the test data at the input clock frequency and to output the test data at the plurality of output clock frequencies provided by the frequency modifier.

Therefore, the frequency shifter may be used to test or verify the functionality of a digital communication device, such as a chip or computing device that communicates using a protocol that allows for differences in the frequency or clock speed of data received within a specific allowed parameter range for a period of time. Specifically, such a communication chip may include an input or receiver data buffer to receive data that may include marker type packets or other data that may be dropped or consumed by the receiving chip to allow the chip to receive data at different frequencies within an allowed parameter range. Moreover, embodiments of the invention allow the clock speed or frequency of test data sent to such a communication test to vary over a time (e.g., such as by increasing or decreasing with respect to time), such as to be greater than or less than the nominal frequency of data received expected by the chip during test or validation of the chip.

Figure 1:
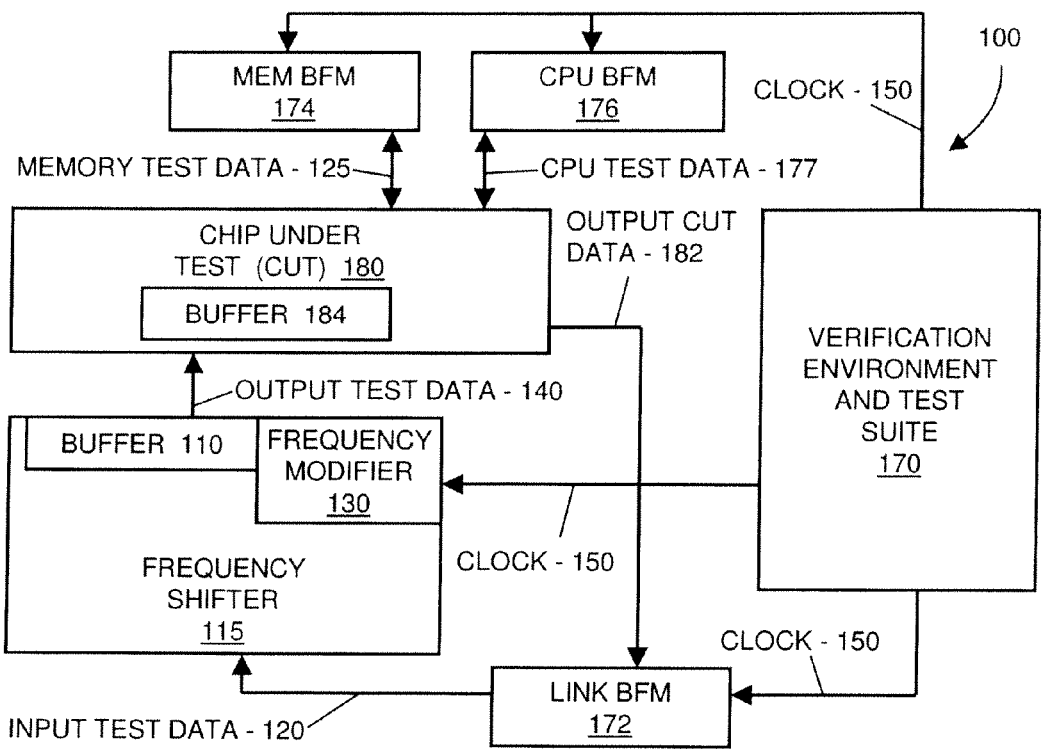
FIG. 1 is a block diagram of a system for varying the frequency of test data to be transmitted to a chip under test (CUT).

For example, a system or apparatus may be set up to test a chip under test (CUT) that uses the frequency shifter to transmit test data and/or communication data to the CUT at clock speeds or frequencies that vary over time (e.g., such as according to a test protocol). The transmitted test data frequency may be varied by increasing, decreasing, and/or maintaining the frequency to send the data to the CUT at a rate within specification requirements, greater than specification requirements, and/or less than specification requirements, such as to underflow or overflow the data receive buffer of the CUT. For instance, FIG. 1 is a block diagram of a system for varying the frequency of test data to be transmitted to a chip under test (CUT). FIG. 1 shows system 100 including chip under test (CUT) 180 electronically interfaced or coupled to frequency shifter 115 which is electronically interfaced or coupled to verification environment and test suite 170 and link bus functional model (BFM) 172. FIG. 1 also shows CUT 180 interfaced with or electronically coupled to link BFM 172, memory (MEM) BFM 174 and central processing unit (CPU) BFM 176. In turn, MEM BFM 174, CPU BFM 176, and link BFM 172 are interfaced or electronically coupled to verification environment and test suite 170. It is considered that the interface or electronic couplings mentioned above may be various digital or analog electronic data paths such as a data bus, a link, a wire, a line, a printed circuit board trace, etc.

FIG. 1 also shows memory test data 175 transmitted between MEM BFM 174 and CUT 180, and CPU test data 177 transmitted between CPU BFM 176 and CUT 180. Input test data 120 is shown transmitted from link BFM 172 to frequency shifter 115 and output test data 140 is shown transmitted from frequency shifter 115 to CUT 180. Similarly, output CUT data 182 is shown transmitted from CUT 182 to link BFM 172. It is considered that output CUT data 182 may be transmitted by a transmitter which may or may not be part of CUT 180, such as by output CUT data 182 being transmitted to link BFM 172 by a transmitter of CUT 180.

According to embodiments, CUT 180 may be a computing device, digital communication chip, digital signal processor, device that supports asynchronous communication, active silicon device, device for communicating over a peripheral component interconnect (PCI) bus, device for communicating over a PCI-Express (PCI-E) link, device having a data buffer to receive data communicated to the device (e.g., such as an elastic data buffer to receive input data from a link), or other device capable of compensating for drift or change in the clock speed or frequency of data received (e.g., such as data received over a data link). More particularly, it is contemplated that CUT 180 may be an electronic device or chip to operate as required by the PCI-E specification, PCI Express Base Specification, Revision 1.0a, published Apr. 15, 2003 (published by PCI-Special Interest Group (SIG) Administration, Portland, Oreg.). Thus, system 100 may be designed to test or verify that CUT 180 is capable of compensating for a drift or variance in the frequency of data received over time, such as data received during asynchronous communications and/or a link as defined by the PCI-E specification.

CUT 180 is shown having buffer 184 which may be a data buffer, such as an elastic data buffer to receive input, receive, or test data. It can be appreciated that CUT 180 may include other circuitry or electronic devices through which input or receive data will flow before entering buffer 184, such as processing, SER DFS, and PHY components. Thus, buffer 184 may be a buffer to receive data such as across a link or as otherwise appropriate for CUT 180.

According to embodiments, frequency of clock 150 may be proportional to a crystal, clock frequency, or frequency received by test suite 170. Similarly, the frequency that CUT 180 operates at, such as the frequency that CUT 180 receives data at and/or consumes data from buffer 184 may be related to or derived from a crystal or clock frequency of CUT 180 or a frequency received by CUT 180. Thus, the frequency of output CUT data 182 and clock 150 may vary from each other in an amount measured in parts per million (PPM) of a nominal frequency, such as a frequency according to a communication specification (e.g., such as the PCI-E specification) and may differ according to the crystal, clock, or received frequency of CUT 180 and/or test suite 170.

It is to be appreciated that test suite 170 may consider data or responses from various entities of system 100, such as data or responses from CUT 180, frequency shifter 115, link BFM 172, MEM BFM 174, and/or CPU BFM 176 to control, monitor, or provide the outcome of a test or verification as described herein. Specifically, for instance, suite 170 may consider output CUT data 182 received by link BFM 172 and/or depth information 162 received by frequency modifier 130. Moreover, suite 170 and/or frequency modifier 130 may consider output CUT data 182 received by link BFM 172 and/or depth information 162 received by frequency modifier 130 to control or vary the output frequency of output test data 140 (e.g., such as to control or vary output clock frequency 160 mentioned below with respect to FIG. 2).

FIG. 1 also shows test suite 170 providing clock 150 to MEM BFM 174, CPU BFM 176, link BFM 172, and frequency shifter 115. Clock 150 may be a clock frequency or a test frequency such as a frequency used to drive or synchronize devices of system 100, such as the devices to which clock 150 is provided. Moreover, clock 150 may be a test frequency, clock frequency, or crystal frequency as described herein related to, corresponding to, or from which to derive an input data frequency, first data frequency, or output clock frequency, as described herein. Specifically, for example, the frequency or clock speed of input test data 120, output test data 140, memory test data 175, and/or CPU test data 177 may all related to, correspond to, or be derived from clock 150.

For example, FIG. 1 shows frequency shifter 115 having buffer 110 and frequency modifier 130. According to embodiments, frequency modifier 130 may shift the frequency of clock 150, such as a test frequency, to an output clock frequency and vary the output clock frequency over time. Moreover, the output clock frequency may be used to change the frequency of input test data 120 to the frequency of output test data 140. Therefore, output test data 140 may be transmitted at a frequency equal to, corresponding to, related to, derived from, and/or that considers the output clock frequency provided by frequency modifier 130. For example, frequency shifter 115 is shown having buffer 110 which may be a data buffer to receive input test data 120 and hold a portion of input test data 120 to be transmitted to CUT 180 as output test data 140 at an output data frequency related to, corresponding to, derived from, or considering the output clock frequency from frequency modifier 130.

It can be appreciated that frequency shifter 115 may include other circuitry or electronic devices through which input or receive data will flow before entering buffer 110, such as a digital signal processor, a computing device, input processing circuitry, Serializer Deserializer (SERDES), and physical link components. Thus, buffer 110 may be a buffer to receive data such as across a link or as otherwise appropriate for CUT 180.

Figure 2:
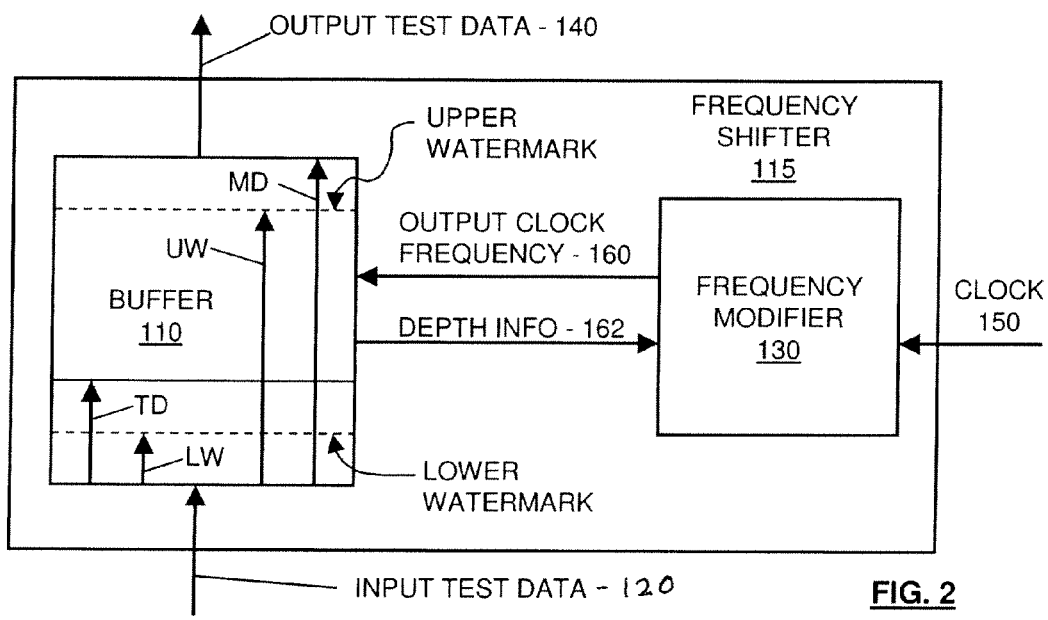
FIG. 2 is a block diagram of the frequency shifter of FIG. 1.

For example, FIG. 2 is a block diagram of the frequency shifter of FIG. 1. FIG. 2 shows frequency shifter 115 including frequency modifier 130 elastic buffer 110, where frequency modifier 130 receives clock 150, and elastic buffer 110 receives input test data 120. Output test data 140 is shown being output by elastic buffer 110. It is also contemplated that output test data 140 may be transmitted by a transmitter which may or may not be part of frequency shifter 115, such as by output test data 140 being transmitted to CUT 180 by a transmitter of frequency shifter 115.

In addition, FIG. 2 shows output clock frequency 160 sent by frequency modifier 130 and received by elastic buffer 110, and depth information 162 sent by elastic buffer 110 and received by frequency modifier 130. Output clock frequency 160 may be an output clock frequency, or second data frequency as described above with respect to frequency modifier 130 of FIG. 1. Depth information 162 may provide information describing or identifying the amount of data, such as test data retained within buffer 110.

More particularly, buffer 110 is shown having maximum data storage capacity MD, upper watermark UW, lower watermark LW, and test data TD. It may be appreciated that maximum data storage MD, upper watermark UW, and lower watermark LW may represent amounts, volumes, and/or capacities of data storage for buffer 110 (e.g., such as by representing an amount of digital data bytes or bits of data storage capacity). Specifically, according to embodiments, buffer 110 may have a maximum data storage capacity MD, such as where buffer 110 is an elastic buffer and MD defines the maximum amount of digital data bytes or bits of data storage capacity for the elastic buffer. Similarly, test data TD may represent an amount and/or volume of digital data actually existing or stored in buffer 110. Moreover, it is contemplated that test data TD may represent actual communication data to be transmitted to CUT 180 (e.g., such as by representing an amount of digital data bytes or bits of data), or other data as identified above with respect to input test data 120, or below with respect to FIG. 5.

According to embodiments, upper watermark UW may be equal to 150%, 160%, 175%, 180%, 185%, 190%, 200%, or any selected or predetermined percentage of an amount of data required to completely fill buffer 184 (e.g., such as where buffer 184 is an elastic buffer and UW defines the above percentage of the maximum data storage capacity of buffer 184). Thus, UW may be equal to an amount of output test data 140 required to fill 160% or 180% of buffer 184. Likewise, lower watermark LW may be 5%, 10%, 20%, 25%, 30%, 40%, 50%, or any selected or predetermined percentage of an amount of data required to completely fill buffer 184 (e.g., such as where buffer 184 is an elastic buffer and LW defines the above percentage of the maximum data storage capacity of buffer 184). Thus, LW may be equal to an amount of output test data 140 required to fill 20% or 40% of buffer 184.

Now referring to FIGS. 1 and 2, according to one embodiment, buffer 110 may be an elastic data buffer that receives input test data 120 at various input data frequencies corresponding to clock 150. Also, according to embodiments, buffer 110 may have a maximum data storage capacity MD larger than the maximum data storage capacity of buffer 184. For example, maximum data storage capacity MD may be at least twice as large as the maximum data storage capacity of buffer 184, such as being twice as large, 2.5 times as large, 3 times as large, 3.5 times as large, or 4 times as large as that of buffer 184. Note that the amount of input test data 120 retained by buffer 110 depends on maximum data storage capacity MD such that test data TD must always be less than or equal to maximum data storage capacity MD.

Also, it is contemplated that input test data 120 may include actual or test data to simulate or test a communication device to communicate using a protocol including data packets, asynchronous communication data packets, marker type data packets and data having symbols. For example, test data 120 may include marker type data packets such as skip-order-sets for data communicated over a PCI-E link or other data packets or additional data transmitted to a data receiver to allow the data receiver to stay synchronized with the data transmitter. For instance, test data 120 can have data or data packets intended to be dropped by a data receiver the receiver is consuming data more slowly than the data is being received so that there is not an overflow of data at the receiver data buffer, and/or intended to be consumed but ignored when the receiver is consuming data more quickly than the data is being received so that an underflow of data does not occur and empty the received buffer of the data receiver. Thus, the data receiver may operate within or satisfy receive data clock speed, rate, and/or frequency parameters of a specification, such as the PCI-E specification. In addition, it is contemplated that the data receiver may operate and be within specification parameters even though the receiver is consuming data more quickly than the data is being received and empties the received buffer of the data receiver.

It is also considered that test data 120 may include data symbols having various bits of data in each symbol to be interpreted or processed by the data receiver, such as CUT 180. For example, test data 120 may include data symbols having 4 bits, 8 bits, 10 bits, 16 bits, or more than 16 bits of data to be interpreted by the data receiver. As related to test data 120 having data symbols, upper watermark UW may be defined as maximum data storage capacity MD minus the data size of a data symbol multiplied by an integer, such as a number between 1,000 and 10,000. Likewise, lower watermark LW may be defined as the data size of a data symbol multiplied by an integer, such as a number between 1,000 and 10,000.

Input test data received by buffer 110 (e.g., such as test data TD stored in buffer 110) may subsequently be output as output test data 140 over a period of time at various output data frequencies corresponding to output clock frequency 160. For instance, output test data 140 may be transmitted from frequency shifter 115 to CUT 180 at frequencies that change over time. Thus, the frequency or clock speed of output test data 140 may be related to, correspond to, be derived from, be equal to, and/or be proportional to clock frequency 160, which may be the frequency of clock 150 shifted or ramped up or down in frequency (e.g., "varied") over time. Specifically, output test data 140 may be test data TD transmitted at output clock frequency 160, as output clock frequency 160 is increased and decreased over time. Consequently, the output data frequency of output test data 140 may vary, change, fluctuate up and down, or be held at a constant frequency over time depending on whether output clock frequency 160 varies or is held constant.

According to embodiments, the relationship between input test data 120, output test data, clock 150 and output clock frequency 160 allows frequency modifier 130 to control the amount of data stored in buffer 110 (e.g., such as the amount of test data TD) over time by shifting, varying, changing, increasing, decreasing, keeping constant output clock frequency 160 as compared to the frequency of clock frequency 150 over a period of time. As shown in FIG. 2, since frequency modifier 130 is receiving depth information 162 it is possible for frequency modifier 130 to vary or select output clock frequency 160 to control the amount of data in buffer 110, such as test data TD. More particularly, since input test data 120 is being received by buffer 110 at the frequency of clock 150 and output test data 140 is being transmitted by or removed from buffer 110 at output clock frequency 160, the amount of test data in buffer 110 may be increased, decreased, or kept the same depending on whether output clock frequency 160 is greater than, less than, or equal to the frequency of clock 150.

Thus, the amount of data in buffer 110, such as test data TD may be increased by selecting, setting, reducing, or decreasing output clock frequency 160 to a frequency less than that of clock 150. Alternatively, the amount of data in buffer 110, such as test data TD, may be decreased by setting, selecting, reducing, or decreasing output clock frequency 160 to a frequency greater than that of clock 150. In fact, it is possible to retain an amount of data in buffer 110, such as test data TD, less than or equal to upper watermark UW by increasing or setting output clock frequency 160 greater than the frequency of clock 150 when TD is greater than, equal to, or within a percentage of (e.g., such as within 1%, 2%, 5%, 10%, 20%, or any selected or predetermined percentage) of upper watermark UW. Similarly, it is possible to maintain an amount of data in buffer 110, such as TD, that is equal to or greater than lower watermark LW by decreasing or selecting output clock frequency 160 less than the frequency of clock 150 when TD is less than, equal to, or within a percentage (e.g., within 1%, 2%, 5%, 10%, 20%, or any selected or predetermined percentage) of lower watermark LW. Also note that upper clock frequency 160 may be set equal to the frequency of clock 150 such that the amount of data in buffer 110, such as test data TD remains the same or at a constant amount of data in buffer 110.

Furthermore, according to embodiments, since frequency modifier 130 is receiving depth information 162 it is possible for frequency modifier 130 to vary, change or select output clock frequency 160 to cause TD to increase or decrease by between 5% and 50% of maximum data storage capacity MD over a period of time. Likewise, output clock frequency 160 may be varied or changed by increments to increase or decrease TD by 5%, 10%, 15%, 20%, 25%, or any selected percentage of maximum data storage capacity MD, or the data storage capacity of buffer 184 over a period of time. According to embodiments, such a period of time may be a selected period of time, a random period of time, one period of various random intervals, a periodic or repeating period of time, a period of time equal to the frequency of clock 150 multiplied by an integer between 1,000 and 10,000, a sub-period of time of a total test period, and/or a period of time according or related to a device or link specification requirement, such as the PCI-E specification. For example, a selected period may be a sub period of a total test time or period, where the sub period is defined by the product of an integer (e.g., such as a selected or random number between 1 and 10, or a number greater than 2) multiplied by a duration between consecutive marker type data packets included in input test data 120.

According to embodiments, frequency modifier 130 may vary or set output clock frequency 160 in a range of between 5% and 50% greater than or less than that of the frequency of clock 150, such as by setting output clock frequency 160 to 1%, 2%, 4%, 5%, 10%, 15%, 20%, 25%, 30%, 40%, 50%, or any selected percentage greater than or less than the frequency of clock frequency 150. More particularly, output clock frequency 160 may be set greater than the frequency of clock 150 to cause output test data 140 to be transmitted at a maximum output data frequency such as a frequency that causes test data TD to increase to upper watermark UW during a selected period of time. Similarly, output clock frequency 160 may be set to a frequency less than the frequency of clock 150 to cause output test data 140 to be transmitted at a minimum output data frequency, such as to cause test data TD to be reduced to lower watermark LW during a selected period of time. Notably, output clock frequency 160 may be adjusted, varied, or set constant for intervals of time by frequency modifier 130 to ensure that data retained in buffer 110, such as test data TD, is maintained between or does not exceed the boundaries of upper watermark UW and lower watermarks LW.

More particularly, output clock frequency 160 may be increased or varied to a frequency greater than the frequency of clock 150 so that test data TD increases at a selected rate over time until TD reaches upper watermark UW. Then, output clock frequency 160 may be varied or changed to a frequency less than the frequency of clock 150 so that test data TD decreases from upper watermark UW towards lower watermark LW at a selected rate over time until TD then decreases to lower watermark LW. This process may then be repeated to cause the amount of data in buffer 110 to increase to upper watermark UW and decrease to lower watermark LW repeatedly. It can be appreciated that the above process may also begin with output clock frequency 160 may be varied or changed to a frequency less than the frequency of clock 150, and may end with any desired amount of test data TD in buffer 110.

Similarly, according to an embodiment, upper clock frequency 160 may be varied so that test data TD is increased from an amount of data that is ½ as much as maximum data storage capacity MD and increases towards upper watermark UW. Then, output clock frequency 160 may be varied or changed to decrease TD back to an amount ½ as great as maximum data storage capacity MD. Again, this process may also be repeated, started by decreasing TD and ended with any TD desired, similarly to as described above.

Alternatively, output clock frequency 160 may be varied or changed such that test data TD decreases from an amount of data that is ½ as much as maximum data storage capacity MD and decreases to lower watermark LW. Then, output clock frequency 160 may be varied or changed to increase TD to an amount of data equal to or greater than ½ of maximum test data storage capacity MD. Once more, this process may also be repeated, started by decreasing TD and ended with any TD desired, similarly to as described above.

It is also contemplated that system 100, test suite 170, frequency modifier 130 and/or frequency shifter 115 may implement or include a test protocol for controlling output clock frequency 160. For example, system 100, test suite 170, frequency shifter 115, and/or frequency modifier 130 may include or be capable of interpreting a machine readable medium having data therein which when accessed by a processor (e.g., such as a computer processor, digital signal processor, computer, or device described above with respect to CUT 180) implements a test protocol. Thus, a test protocol may be used to control system 100, test suite 170, frequency shifter 115, frequency modifier 130, buffer 110, and/or output clock frequency 160. In addition it is contemplated that such a test protocol may control MEM BFM 174, CPU BFM 176, link BFM 172, clock 150, input test data 120, maximum data storage capacity MD, upper watermark UW, and/or lower watermark LW. A test protocol as described above may also control or cause a transmitter (e.g., such as a transmitter which may or may not be part of CUT 180, as described above with respect to FIG. 2) to transmit test data TD (e.g., such as a portion of input test data 120 received and retained in buffer 110) over a period of time, at an output frequency corresponding to output clock frequency 160 to CUT 180 (e.g., such as to buffer 184). Furthermore, the test protocol may cause frequency modifier 132 shift output clock frequency 160 prior to the end of each period of time as described above.

For example, according to one embodiment, output clock frequency may be varied to cause test data TD to vary an amount of data equal to 20% of the data storage capacity of buffer 110 or buffer 184 over a selected period of time such as over a period of time between 1,000 and 100,000 cycles of clock 150 (e.g., such as over a period of time equal to 10,000 cycles of clock 150 where clock 150 has a frequency between 1.0 giga-hertz (GHz) and 10 GHz, (such as having a frequency of 2.5 GHz). More particularly, output clock frequency 160 may be varied to cause test data TD to increase or decrease by an amount of data equal to 20% of the maximum data storage capacity of buffer 184 over a time period equal to the duration between marker type data packets or skip-order, set of data received in input test data 120.

Accordingly, output clock frequency 160, frequency modifier 130, frequency shifter 115, test suite 170, system 100, and/or a test protocol thereof may vary or change output clock frequency 160 during or over a period of time depending on total duration of a test, such as a simulation test, validation, verification, or test of CUT 180 with respect to a specification, such as a communication, link, or data receive specification or protocol. Similarly, output clock frequency 160 may also be varied or over a period of time depending on one or more of the following factors: the clock speed or frequency of data input or received by frequency shifter 115, such as the frequency of input test data 120; the desired frequency of data output by frequency shifter 115, such as the desired output frequency of output test data 140; the size of data retained in buffer 110, such as the size of test data TD; a duration between marker type data packets, skip-order-sets, or other synchronization data included in data received by frequency shifter 115 (e.g., such as marker type data included in input test data 120); the frequency of clock 150; the size of buffer 184; and the type of device of CUT 180.

Figure 3:
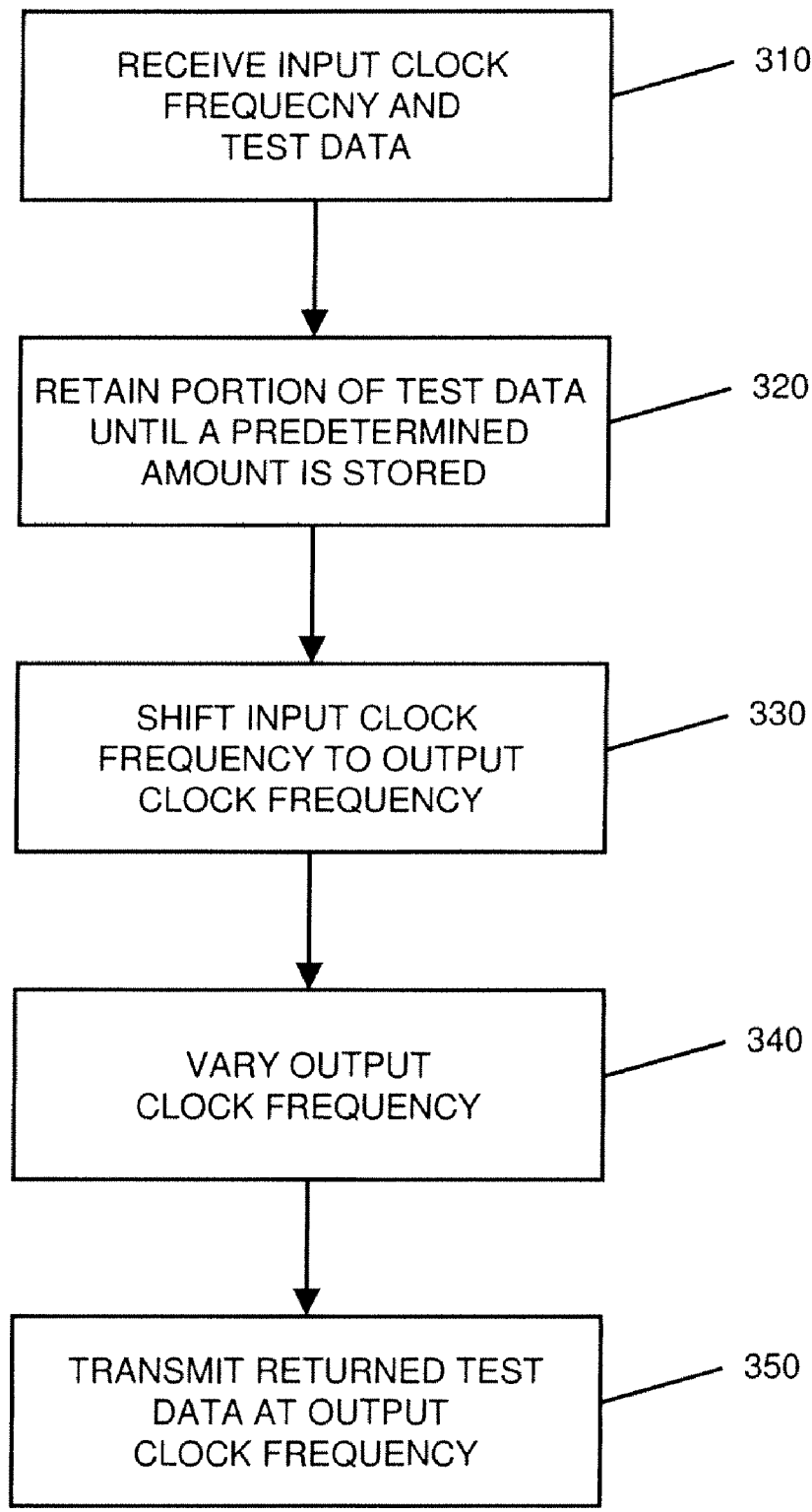
FIG. 3 is a flow diagram of a process for varying the frequency of test data to be transmitted to a CUT.

For instance, FIG. 3 is a flow diagram of a process for varying the frequency of test data to be transmitted to a CUT. At block 310 and input clock frequency (e.g., such as clock 150) and test data (e.g., such as input test data 120) corresponding to the input clock frequency is received (e.g., such as being received by buffer 110). Data and/or clock frequency received at block 310 may be received such as is described above with respect to frequency shifter 115, frequency modifier 130, and frequency buffer 110 of FIGS. 1 and 2.

At block 320 a portion of the test data received (e.g., such as test data TD, which may be a portion of input test data 120) is retained (e.g., such as by being retained in buffer 110) until a predetermined amount of data is stored (e.g., such as data stored in buffer 110). The portion of the test data retained may be 1%, 2%, 4%, 5%, 10%, 15%, 20%, 25%, 30%, 40%, 50%, or any selected percentage of a total amount of input test data or data to be transmitted to CUT 180, such as during a verification or test of CUT 180. More specifically, the portion of test data retained, such as test data TD as shown in FIG. 2, may be an amount of input test data 120 temporarily stored in buffer 110 that will subsequently be transmitted as output test data 140 to CUT 180 during a period of time which may be a sub period of a verification or test period for CUT 180. Moreover, the portion of test data retained at block 320 may correspond to an amount of data in buffer 110 or test data TD as described above with respect to FIG. 2.

At block 330, the input clock frequency (e.g., such as the frequency of clock 150) may be shifted, varied, set, or changed over time to an output clock frequency (e.g., such as output clock frequency 160). For example, the input clock frequency described above at block 310 may be shifted to different output clock frequencies, such as is described above with respect to output clock frequency 160 of FIGS. 1 and 2.

At block 340 the output clock frequency (e.g., such as output clock frequency 160) is varied (e.g., such as by being varied over a period of time to different output clock frequencies). For example, the output clock frequency may be varied or changed over time during a period of time as described above with respect to output clock frequency 160, frequency modifier 130, and/or a test protocol thereof of FIGS. 1 and 2.

At block 350 the test data retained (e.g., such as test data TD) is transmitted (e.g., such as by being transmitted as output test data 140 from buffer 110 to CUT 180), such as at an output data frequency derived from or corresponding to output clock frequency 160. Thus, the retained test data may be transmitted such as is described above for frequencies and data for transmitting output test data 140 or test data TD from frequency shifter 115 or buffer 110 to CUT 180 or buffer 184, with respect to FIGS. 1 and 2.

Figure 4:
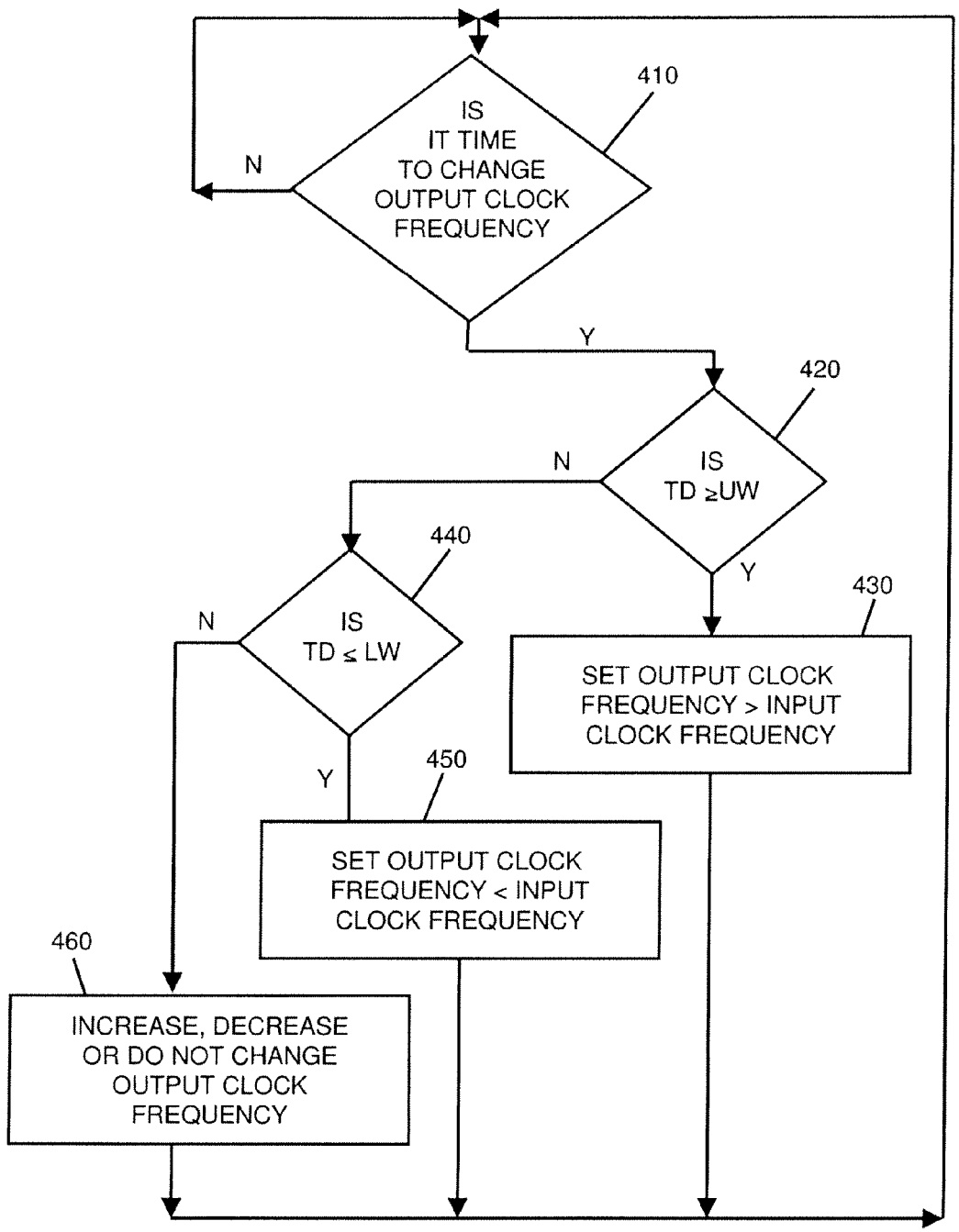
FIG. 4 is a flow diagram of a process for varying an output clock frequency to derive a frequency to transmit test data to a CUT.

It can be appreciated that various processes or methods may be provided or performed to shift or vary the output clock frequency of the data to be transmitted to CUT 180. For instance, FIG. 4 is a flow diagram of a process for varying an output clock frequency to derive a frequency to transmit test data to a CUT. FIG. 4 shows a process which may or may not represent block 340 of FIG. 3. At block 410 it is determined whether it is time to change the output clock frequency, such as by determining whether it is the beginning of the next sub period of time, period of time, interval of time, or random interval of time to vary change or set output clock frequency 160 as described above with respect to FIG. 2. If at block 410 it is not time to change the output clock frequency the process returns to block 410. Alternatively, if at block 410 it is determined that it is time to change the output clock frequency, the process continues to block 420.

At block 420 it is determined whether the amount of data currently stored in buffer 110, such as test data TD, is greater than or equal to the upper watermark UW. If at block 420 it is determined that the amount of data in buffer 110 is greater than or equal to upper watermark UW the process continues to block 430. Block 420 may be accomplished such as is described above with respect to frequency shifter 115, frequency modifier 130, and/or a test protocol thereof, as described above with respect to FIGS. 1 and 2.

At block 430 the output clock frequency may be set, change, or varied to a frequency that is greater than the input clock frequency, such as by setting output clock frequency 160 to a frequency greater than the frequency of clock 150, such as is described above with respect to upper clock frequency 160 and/or frequency modifier 130 of FIGS. 1 and 2.

If at block 420 it is determined that the amount of data currently stored in buffer 110 is not greater than or equal to upper watermark UW, the process continues to block 440. At block 440 it is determined whether the amount of data currently stored in buffer 110, such as test data TD, is less than or equal to lower watermark LW. If the amount of data currently stored in buffer 110 is less than or equal to lower watermark LW the process continues to block 450. The determination at block 440 may be made such as by a processor method described above with respect to frequency modifier 130 and/or frequency shifter 115 of FIGS. 1 and 2.

At block 450 the output clock frequency is set to a frequency less than or equal to the frequency of the input clock frequency. For example, output clock frequency 160 may be set to a frequency less than or equal to the frequency of clock 150, as described above with respect to output clock frequency 160 and/or frequency modifier 130 of FIGS. 1 and 2.

If at block 440 it is determined that the amount of data currently stored in buffer 110 is not less than or equal to lower watermark LW the process continues to block 460. At block 460 the output clock frequency may be kept constant, increased or decreased. For example, at block 460 upper clock frequency 160 may be left unchanged, increased, or decreased. Thus, as previously noted, output clock frequency 160 may be varied with respect to the frequency of clock 150, such as to keep the amount of data in buffer 110 unchanged or increase the amount of data in buffer 110 towards upper watermark UW, or decrease the amount of data in buffer 110 towards lower watermark LW over a period of time (e.g., such as by increasing or decreasing test data TD by a selected amount over a period of time). Likewise, at block 460, output clock frequency 160 may be varied according to a protocol, as described above with respect to system 100, test suite 170, frequency shifter 115, frequency modifier 130, and/or output clock frequency 160 of FIGS. 1 and 2. Thus, at block 460, for example, output clock frequency 160 may be increased, decreased, or kept constant for a period of time equal to the amount of time until at block 410 it is time to change the output clock frequency, as described above. It is also contemplated that the processes described herein (e.g., such as the processes described above to vary output clock frequency 160 with respect to FIGS. 1 and 2), and/or various other appropriate processes or algorithms may be may be used or combined to vary output clock frequency at block 460. According to an embodiment block 460 may or may not represent block 340 of FIG. 3.

Thus, FIG. 4 may represent a process or protocol used to control system 100, test suite 170, frequency shifter 115, frequency modifier 130, and/or output clock frequency 160. It can be appreciated that the process of FIG. 4 and/or block 460 may be affected by factors similar to those described above with respect to block 340.

Figure 5:
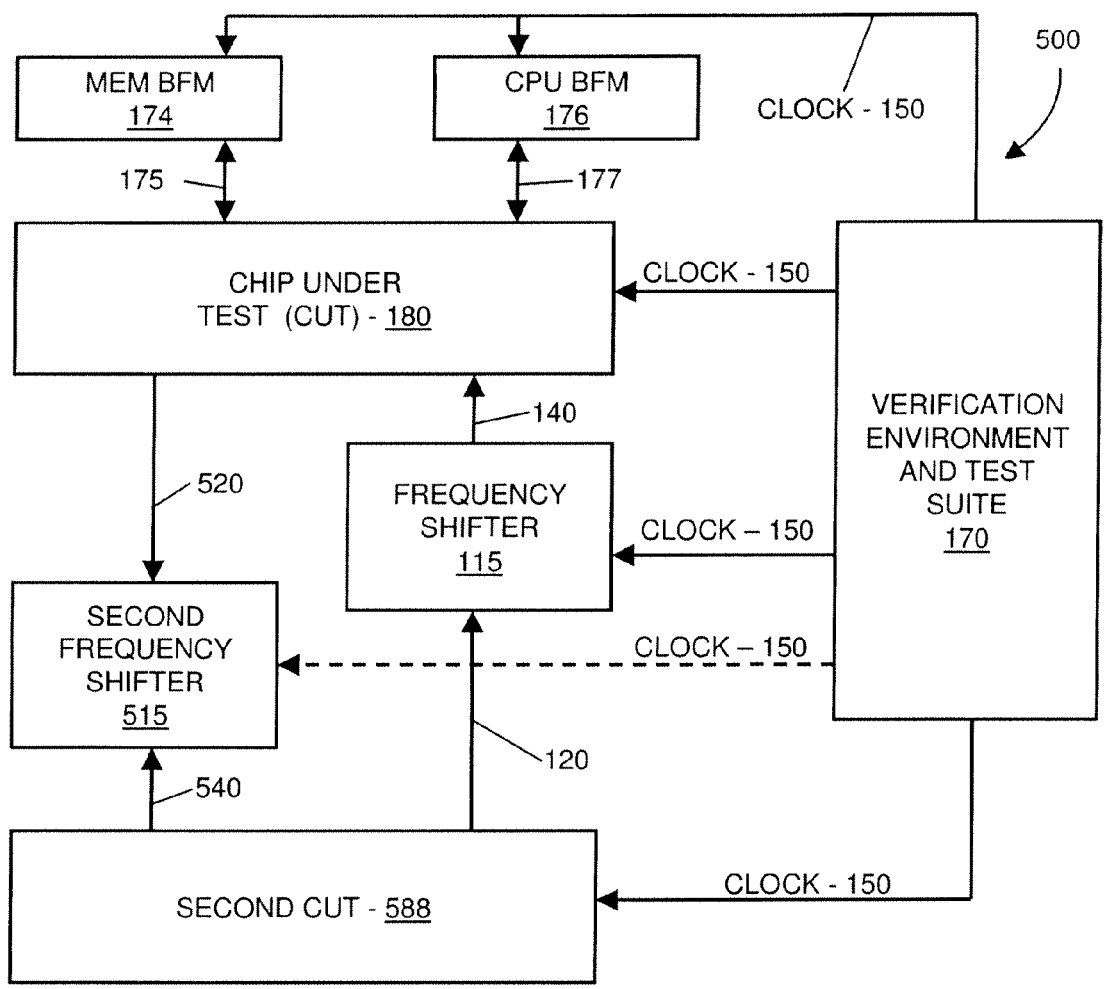
FIG. 5 is a block diagram of a system for varying the frequency of data to be transmitted between two communication chips.

According to embodiments it is also possible that link BFM 172 may be replaced by an actual communication device, such as a communication device or chip, to provide system level verification for testing. In such an arrangement, two frequency shifters may be used to shift the frequency of the data being communicated between the CUT 180 and the other communication device or chip. For example, FIG. 5 is a block diagram of a system for varying the frequency of data to be transmitted between two communication chips. FIG. 5 shows system 500 including MEM BFM 174, CPU BFM 176, test suite 170, clock 150, CUT 180, output test data 140, frequency shifter 115, input test data 120, memory test data 175, and CPU test data 177, as described above with respect to FIGS. 1 and 2. In addition FIG. 5 shows second frequency shifter 515 to shift the frequency of clock 150 to a second output clock frequency (such as an output clock frequency as described above with respect to output clock frequency 160 of FIGS. 1-4). Thus, second frequency shifter 515 may shift the frequency of clock 150 to a second output clock frequency according to a test protocol, method, or process as described above with respect to system 100, test suite 170, frequency shifter 115, frequency modifier 130 and/or output clock frequency 160 of FIGS. 1-4.

FIG. 5 also shows second input test data 520 transmitted by CUT 180 and received by second frequency shifter 515, such as by being received by an elastic buffer of second frequency shifter 515 (e.g., such as an elastic buffer similar to buffer 184). It should be appreciated that second input test data 520 may correspond to output CUT data 182 of FIG. 1.

FIG. 5 also shows second output test data 540 transmitted by second frequency shifter 515 and received by second CUT 588. Second output test data may be test data at a frequency and/or similar to output test data 140 as described above with respect to FIG. 1. As shown in FIG. 5, input test data 120 is transmitted by second CUT 588 to frequency shifter 115 at a frequency corresponding to or derived from clock 150. Thus, second CUT 588 replaces link BFM 172 of FIG. 1.

Accordingly, the link from CUT 180, second input test data 520, second frequency shifter 515, second output test data 540, and to second CUT 588 may transmit data at a clock speed or frequency that is independent and irrespective of the clock speed or frequency of data transmitted over the link of second CUT 588, first input data 120, frequency shifter 115, output data 140, and CUT 180. For instance, system 500 may provide an environment (e.g., such as including test suite 170, MEM BFM 174, CPU BFM 176, clock 150 and/or a test protocol as described above with respect to FIGS. 1-4) that verifies or tests the functionality of CUT 180 and/or second CUT 588 (e.g., such as to verify or test the ability of CUT 180 or second CUT 588 to receive data at frequencies that vary with respect to time as required by the PCI-E specification) with actual data transmitted between the communication chips as the data would be transmitted if the chips were in an actual link instead of system 500.

According to embodiments, system 500 may be used to expose or target testing to expose idiosyncrasies or variations between CUT 180 and second CUT 588 in situations where CUT 180 is a device similar to second CUT 588 and/or in situations where CUT 180 is a device different than second CUT 588. For example, second CUT 588 may be a device as described above with respect to CUT 180. In addition, according to embodiments, CUT 180 and second CUT 588 may be similar or different devices, such as by CUT 180 being a different type of communication chip or device than that of second CUT 588.

Specifically, input test data 120 and second input test data 520 may be communication data transmitted by second CUT 588 and CUT 180 respectively in response to data received by second CUT 588 from CUT 180 and data received by CUT 180 from second CUT 588 respectively. Thus, the data received by second CUT 588 and CUT 180 is actual communication data or responses from another communication device or chip and is not simulated or otherwise fabricated test data, such as test data provided by link BFM 172 of FIG. 1. Hence, system 500 may be described as a system level test or verification.

The invention is described with reference to specific embodiments thereof. However, it will be evident that various modifications and changes may be made thereto without departing from the broader spirit and scope of the invention as set forth in the claims. The specification and drawings are, accordingly, to be regarded in an illustrative rather than a restrictive sense.

The invention claimed is:

1. A method comprising:
receiving an input clock frequency and test data received at an input data frequency corresponding to the input clock frequency;
retaining a portion of the test data received;
shifting the input clock frequency to an output clock frequency based on an asynchronous communications device test protocol;
varying the output clock frequency over a period of time;
transmitting over the period of time, test data, wherein transmitting occurs at an output data frequency corresponding to the output clock frequency.

2. The method of claim 1, wherein the output data frequency is a frequency of the test data retained, transmitted at the output clock frequency.

3. The method of claim 1, wherein retaining comprises storing the test data received in a first data buffer, wherein transmitting comprises transmitting over the period of time, the test data stored in the first data buffer, and wherein transmitting over the period of time comprises transmitting to a second data buffer of a chip that supports asynchronous communications, and wherein varying includes changing the output clock frequency every between 1,000 and 10,000 input clock frequency cycles.

4. The method of claim 3, wherein varying the output clock frequency includes:
setting the output clock frequency to greater than the input clock frequency while the test data retained in the first data buffer is greater than an asynchronous communications test specification upper watermark of an amount of test data to fill the second data buffer; and
setting the output clock frequency to less than the input clock frequency while the test data retained in the first data buffer is less than an asynchronous communications test specification lower watermark of an amount of test data to fill the second data buffer.

5. The method of claim 1, wherein varying includes increasing the output clock frequency to a selected maximum output data frequency based on an asynchronous communications device test protocol during a first sub-period of the period of time and decreasing the output clock frequency to a selected minimum output data frequency based on an asynchronous communications device test protocol during a second sub-period of the period of time.

6. The method of claim 1, wherein varying includes changing the output clock frequency during the period of time depending on at least one of a total duration of a test of a chip, the input data frequency, the output data frequency, the size of the retained portion of test data, skip-order-sets included in the test data received, and a duration between marker types of data packets included in the test data received.

7. The method of claim 1, wherein varying the output clock frequency over the period of time includes one of increases and decreases in the output clock frequency one of periodically for a selected interval of time and for random intervals during the period of time.

8. The method of claim 1, wherein varying the output clock frequency over the period of time includes periodically increasing or decreasing the output clock frequency by one of a selected frequency and random increments of frequency to set the output clock frequency to a frequency sufficient to maintain the test data retained, between an upper watermark and a lower watermark.

9. The method of claim 1, wherein varying the output clock frequency over the period of time includes increasing and decreasing the output clock frequency in a range of between twenty percent greater and twenty percent less than the input clock frequency.

10. The method of claim 1, wherein varying the output data frequency over the period of time includes increasing and decreasing the output data frequency in a range of between ten percent greater and ten percent less than the input data frequency.

11. An apparatus comprising:
a processor coupled to a memory;
the memory storing data that when executed by the processor causes the processor to implement an asynchronous communications device test protocol including:
an elastic data buffer to receive test data at least one input data frequency corresponding to at least one input clock frequency and to output the test data over a period of time at a plurality of output data frequencies corresponding to a plurality of output clock frequencies, the elastic data buffer having a data storage capacity based on an asynchronous communications device test protocol to retain a plurality of portions of the test data;
a frequency modifier to shift the at least one input clock frequency to the plurality of output clock frequencies during the period of time based on an asynchronous communications device test protocol.

12. The apparatus of claim 11, further comprising a transmitter to transmit the test data to be output during the period of time to a receive data buffer of a computing device that supports asynchronous communications.

13. The apparatus of claim 12, wherein the elastic data buffer has a maximum data storage capacity that is at least greater than a maximum data storage capacity of the receive data buffer.

14. The apparatus of claim 13, wherein the test data includes one of asynchronous communication data packets, marker type data packets, and data symbols having a selected number of bits of data to be interpreted by a chip.

15. The apparatus of claim 14, wherein the data storage capacity is defined as the maximum data storage capacity minus at least the product of a selected integer and a data size of a data symbol.

16. The apparatus of claim 11, wherein the frequency modifier is to increase the output clock frequency to a frequency greater than the input clock frequency when a portion of the test data retained is greater than an upper water mark of the data storage capacity, and to decrease the output clock frequency to a frequency less than the input clock frequency when a portion of the test data retained is less than a lower water mark of the data storage capacity, and, wherein the frequency modifier is to shift the at least one input clock frequency to the plurality of output clock frequencies during the period of time according to a test protocol.

17. An apparatus comprising:
means for receiving an input clock frequency and test data received at an input data frequency corresponding to the input clock frequency;
means for retaining a portion of the test data received;
means for shifting the input clock frequency to an output clock frequency based on an asynchronous communications device test protocol;
means for varying the output clock frequency over a period of time;
means for transmitting over the period of time, test data retained, wherein transmitting occurs at an output data frequency corresponding to the output clock frequency.

18. The apparatus of claim 17, wherein the means for transmitting comprises:
means for transmitting to a chip that supports asynchronous communications; and
means to transmit at an output data frequency equal to a frequency of the test data retained, transmitted at the output clock frequency.

19. The apparatus of claim 18, wherein means for varying the output clock frequency includes:
means for setting the output clock frequency to greater than the input clock frequency while the test data retained is greater than an asynchronous communications test specification upper watermark of an amount of test data to fill the second data buffer; and
means for setting the output clock frequency to less than the input clock frequency while the test data retained is less than an asynchronous communications test specification lower watermark of an amount of test data to fill the second data buffer.

* * * * *

UNITED STATES PATENT AND TRADEMARK OFFICE
CERTIFICATE OF CORRECTION

PATENT NO.       : 8,209,563 B2             Page 1 of 1
APPLICATION NO.  : 12/756998
DATED            : June 26, 2012
INVENTOR(S)      : Sharma et al.

It is certified that error appears in the above-identified patent and that said Letters Patent is hereby corrected as shown below:

In the Claims

Claim 11, in column 13, at line 45 delete, "data at least" and insert -- data at at least --.

Signed and Sealed this
First Day of April, 2014

Michelle K. Lee
*Deputy Director of the United States Patent and Trademark Office*